Aug. 25, 1959  P. DE BURIATTE PHILPOT  2,900,789
DISCHARGE NOZZLES FOR PROPULSIVE JETS
Filed Nov. 25, 1955  2 Sheets-Sheet 1

Inventor
PETER de BURIATTE PHILPOT
By
*J Schmitt*
Attorneys

Aug. 25, 1959  P. DE BURIATTE PHILPOT  2,900,789
DISCHARGE NOZZLES FOR PROPULSIVE JETS
Filed Nov. 25, 1955  2 Sheets-Sheet 2

Inventor
PETER de BURIATTE PHILPOT
By
Attorneys

United States Patent Office 2,900,789
Patented Aug. 25, 1959

2,900,789

DISCHARGE NOZZLES FOR PROPULSIVE JETS

Peter de Buriatte Philpot, Fleet, England, assignor to the Minister of Supply, in Her Majesty's Government of the United Kingdom of Great Britain and Northern Ireland, London, England Application November 25, 1955, Serial No. 549,081

Claims priority, application Great Britain November 26, 1954

1 Claim. (Cl. 60—35.6)

The invention relates to discharge nozzles for propulsive jets.

An object of the invention is to provide such a nozzle in which the nozzle defining structure is capable in one position of defining a nozzle of covergent-divergent configuration but which is movable to modify the nozzle configuration. Another object of the invention is to provide for such modification in a nozzle of near circular transverse section as is desirable for reasons of symmetry and reduction in periphery of the nozzle.

The invention consists in a nozzle having a number of wall elements of concave inward arcuate section transversely of the nozzle arranged consecutively circumferentially of the nozzle, each of which wall elements is pivoted in the outlet plane of the nozzle or in a transverse plane somewhat upstream thereof about an axis extending chordwise of its section in that plane, the wall elements having a longitudinal section of concave outward curved form. Thus the elements co-operate in one position to form a nozzle of convergent-divergent configuration of nearly circular transverse section. The invention further consists in that there is provided between each circumferentially adjacent pair of wall elements a sealing wall which extends from one longitudinal edge of one of the elements in overlapping relationship with the other element of the pair and outwardly thereof. Thus when the wall elements are moved from the aforementioned position, wherein they form a convergent-divergent nozzle, in each case outwardly about their pivot axes to change the nozzle configuration, the sealing wall on one element moves relatively to the adjacent element to maintain the peripheral continuity of the nozzle.

The invention may be fully understood from the following description with reference to the accompanying drawings of a constructional embodiment thereof in a propulsion nozzle of a ram jet aircraft. In the drawings Fig. 1 is a sectional view taken along the axis of the propulsive duct of the aircraft.

Figure 1:
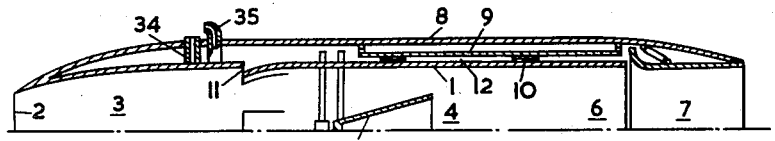

The ram jet propulsion system includes a circular inner duct 1 having an intake 2 and defining the usual compression region 3 and combustion region 4, the baffle 5, serving to stabilise the combustion. The downstream end 6 of the duct 1 directs the combustion products to a propulsion nozzle 7. The duct 1 and nozzle 7 are enclosed in a spaced outer casing 8. Around the combustion region and downstream end of the duct 1 is an intermediate casing 9 attached to the outer casing 8.

Figure 3:
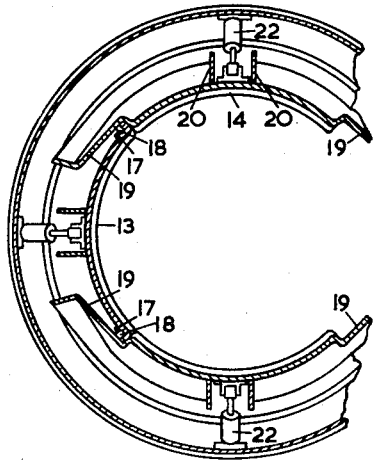
Figs. 3 and 4 are a transverse sectional view taken in the direction of the arrows III—III and IV—IV respectively in Fig. 2.
Figure 5:
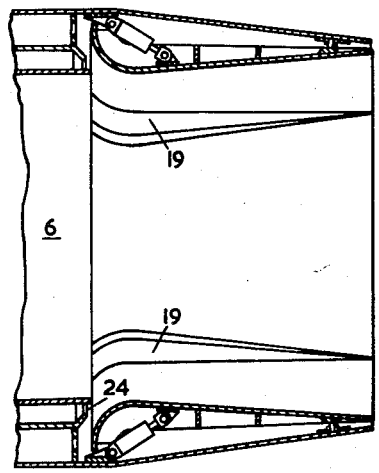
Figs. 5 and 6 are views corresponding to those of Figs. 2 and 4 respectively showing the nozzle structure in a different operative position.
Figure 6:
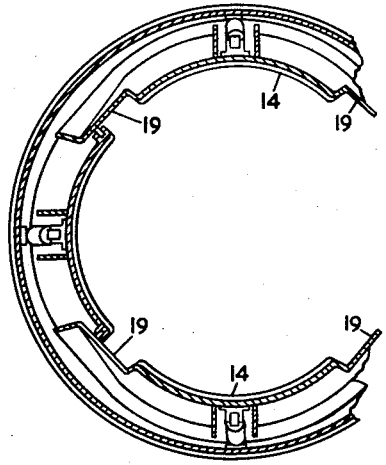
Figure 4:
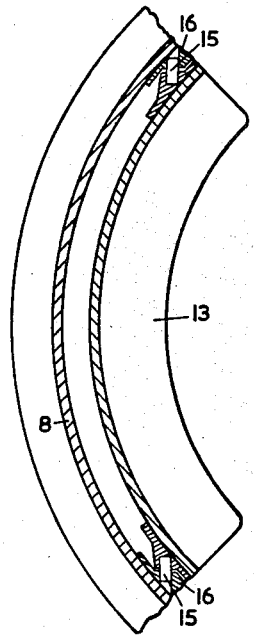

The downstream end 6 of the duct is supported from the intermediate casing so as to be slidable therein in the axial direction to allow for longitudinal thermal expansion of the duct 1. The supporting members 10 are circumferentially spaced and channelled in transverse section. The duct 1 is provided between the compression and combustion regions with ports 11 through which a supply of cooling air is withdrawn from the duct. The cooling air passes outwardly of the duct and is delivered to the region of the nozzle 7 by way of the space 12 between the intermediate casing and the duct. As shown particularly in Figs. 2 and 3, the nozzle 7 may best be considered as a circular-sectioned convergent-divergent nozzle which is divided in mutually perpendicular axial planes to afford four separate wall elements 13, 14. As shown in Fig. 4 each of the wall elements has a pair of pintles 15 extending outwardly in a transverse plane slightly upstream of the nozzle outlet into corresponding recessed members 16 on the casing 8, the pintle axis extending chordwise of the quarter-circular section of the wall elements in the transverse plane. One of the adjacent longitudinal edges of one wall element 13 is provided with a channel 17 having its open side facing outwardly of the fluid flow path. The channel affords a retaining seat for a sealing medium 18 which may consist for example of metallic cloth woven from filaments of heat resisting alloy. To the adjacent longitudinal edge of an adjacent wall element 14 is attached a sealing wall 19 which extends outwardly of the fluid flow path to form a step corresponding in depth to the channel and then normally to the plane of division of the elements bounding the edge. The transverse dimension of the sealing wall 19 increases from the pivoted end to the upstream end of the wall element. The arrangement is such that the sealing medium in the channel of one wall element 13 maintains sliding contact with the sealing wall of the next wall element 14 when the two elements are simultaneously pivoted radially outwardly about their pintles. Thus the sealing walls maintain the circumferential continuity of the nozzle when the wall elements 13, 14 are simultaneously pivoted to vary the cross-sectional area of the nozzle upstream of the plane of the pintles 15 as seen in Fig. 6. Although the sealing walls and channels could be associated one on each side of the same wall element, in the described construction one wall element 14 has sealing walls 19 at both edges and an adjacent wall element 13 has channels 17 at both edges. In this way the fluid loading on each element is always symmetrical. Each wall element has two longitudinally and radially outwardly extending reinforcing webs 20 intermediate between its edges and a plurality of longitudinally spaced circumferential webs 21 extending to the sealing walls or channels and between the longitudinal webs. To provide for pivoting thereof each wall element is provided at a region remote from the plane of the pintles 15 with a hydraulic jack 22 which is pin-jointed to the element and the casing, the four jacks being connected to operate simultaneously. The jacks lie in mutually perpendicular axial planes midway between the dividing planes of the nozzle. In the extreme outward position of the wall elements shown in Figs. 1 and 5 the outwardly curved upstream portions 23 of the elements, which at the other extreme position form the convergent entry portion of the convergent-divergent configuration, are retracted into the annular space between the duct and casing (or more accurately into a downstream extension of that space). In this outer position the minimum area of the nozzle approximates to the area of the duct, the effective configuration of the nozzle being slightly divergent. The downstream end of the cooling air passage 12 defines an annular orifice 24 directed in the downstream direction. Thus the cooling fluid issuing from the orifice flows, when the nozzle wall elements are in the outer retracted position, across to the throat region of the wall elements, so bridging the gap inwardly of the entry portions 23 of the wall elements. The cooling fluid then flows along the inner surface of the wall elements and sealing walls to insulate them from the main fluid stream.

Figure 2:
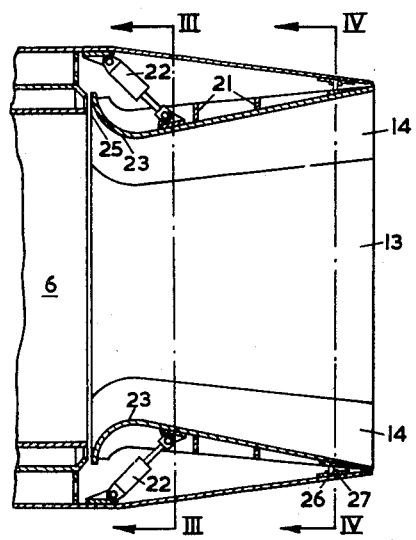
Fig. 2 is a similar view to enlarged scale of the nozzle structure of the aircraft.

When the wall elements are in the inner closed position of Fig. 2 they co-operate, at their upstream extremities, with the downstream end of the duct to define a peripherally extending slit or orifice 25. This peripheral orifice directs the cooling fluid from the annular passage in a radially inward direction appropriate to the contour of the entry portions of the wall elements, so that an insulating skin of cooling fluid again flows between the wall elements and the main fluid stream. The arrangement is such that under operating conditions (that is, when the structure is thermally expanded) the peripheral orifice is smaller than the annular orifice and so supersedes the latter in metering the quantity of cooling fluid. This arrangement is appropriate in a ram jet aircraft, in that the open position of the wall elements is associated, compared with the closed position, with conditions of higher fuel/fluid quantity ratio and consequently high temperatures of the fluid stream in the downstream end 6 of the duct whereby the latter is longitudinally expanded to its greatest extent.

The space outwardly of the wall elements and inwardly of the casing is sealed towards its downstream end by a seal sealing medium 26 similar to the medium 18 retained in a channel 27 extending circumferentially within the casing 8 between each pair of pintles. It will be evident that the relative movement between the elements and the casing at this region is not considerable.

Figure 7:
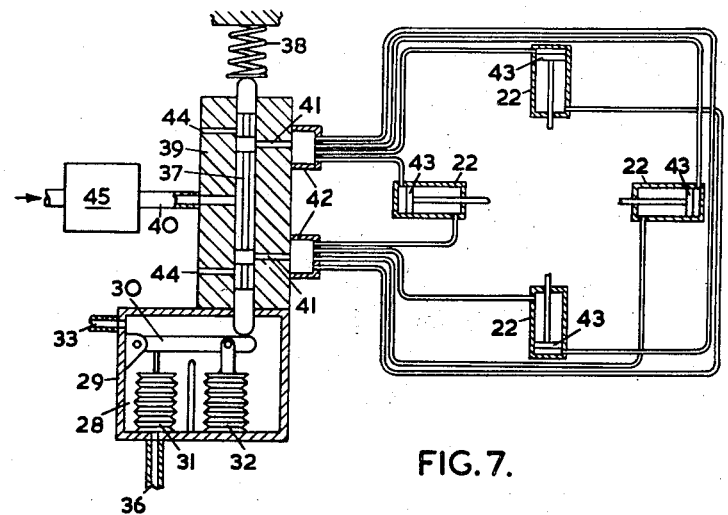
Fig. 7 is a schematic view of the operating mechanism for changing the configuration of the nozzle.

As shown in Fig. 7 provision for the automatic variation of the nozzle configuration at different speeds of the ram jet aircraft consists of a Mach meter 28 of the type in which two different pressure indications are compared and a servo mechanism responsive to that pressure differential or a dependent factor controls the operation of the jacks so that the wall elements are closed as the Mach number increases. The Mach meter consists of a closed chamber 29 containing a pivoted lever 30, the pivoting of lever 30 being controlled by an actuating bellows 31 and an evacuated bellows 32. The chamber is connected through the pipe 33 to a static pressure tube 34 externally mounted on the casing 8. A corresponding kinetic pressure tube 35 is connected by the pipe 36 with the interior of the actuating bellows 31. The lever 30 actuates a piston valve 37, loaded by the compression spring 38, moving in a valve cylinder 39. The valve cylinder has an inlet connection 40 for a supply of servo fluid and ports 41 to two fluid manifolds 42. The manifolds have connections respectively to the opposite sides of the piston 43 of each jack 22. The valve cylinder has exhaust ports 44. When the piston valve is moved from the intermediate position shown, one of the fluid manifolds is open to fluid pressure and the other is open to exhaust, and the piston of each jack is moved by the resulting pressure difference. In the arrangement shown an upward movement of the piston valve corresponding to an increase in Mach number will produce an extension of the jacks to close the wall elements. The servo-fluid is supplied by a pump 45 which is conveniently the fuel pump, the servo fluid being liquid fuel.

Alternatively the servo mechanism is responsive to a comparison between the fluid pressure at entry to the nozzle and the ambient fluid pressure at the nozzle outlet, that is, to the pressure ratio across the nozzle or a dependent factor. The arrangement is essentially similar to that of Fig. 7 but the pipe 36 is connected to a pressure tube mounted in the downstream end 6 of the duct.

I claim:

In a propulsion system a discharge nozzle for a propulsive fluid stream having fluid entry and outlet ends comprising a number of one-piece wall elements extending longitudinally between said ends and arranged consecutively around the fluid stream, said wall elements each having an arcuate transverse section arranged concave inwardly to the fluid stream, supporting means located outwardly of the wall elements in the region of the outlet end of the nozzle, and pivot connections in said region between each one-piece wall element and said supporting means whereby the entire wall element is pivotable about an axis extending chordwise of the arcuate transverse section of the element in said region, said one-piece wall elements each having a curved longitudinal section arranged convex inwardly to the fluid stream, means for pivoting said wall elements simultaneously from an inner position defining a convergent-divergent configuration, outwardly of the fluid stream thereby varying the nozzle configuration, said supporting means comprising a tubular casing extending upstream of the nozzle, said tubular casing having an inner tubular duct for the fluid stream extending upstream from the inlet end of the nozzle and located within and spaced from said casing to define therewith a passage for a cooling fluid, means for supplying a cooling fluid to said passage, said inner tubular duct and the inlet end of said nozzle being separated one from the other whereby cooling fluid is directed through said separation and over the inner surfaces of said one-piece wall elements, the separation of said inner end of said nozzle from said inner tubular duct being increased by the pivoting of said wall elements outwardly from their inner position whereby the flow of cooling fluid therethrough is increased.

References Cited in the file of this patent

UNITED STATES PATENTS

| | | |
|---|---|---|
| 2,625,008 | Crook | Jan. 13, 1953 |
| 2,671,620 | Andrews | Mar. 9, 1954 |
| 2,675,670 | Tenney | Apr. 20, 1954 |
| 2,697,907 | Gaubatz | Dec. 28, 1954 |
| 2,726,509 | Gist et al. | Dec. 13, 1955 |
| 2,780,056 | Colley | Feb. 5, 1957 |
| 2,796,731 | Morley et al. | June 25, 1957 |
| 2,858,668 | Kelley et al. | Nov. 4, 1958 |

FOREIGN PATENTS

| | | |
|---|---|---|
| 998,358 | France | Sept. 19, 1951 |
| 1,078,724 | France | May 12, 1954 |